United States Patent Office 3,337,626
Patented Aug. 22, 1967

3,337,626
N-ARYL HYDROXYALKYL-ARALIPHATIC AMINES
Kurt Thiele, Frankfurt am Main, and Klaus Posselt, Bergen-Enkheim, Germany, assignors to Deutsche Gold- und Silber-Scheideanstalt vormals Roessler, Frankfurt am Main, Germany
No Drawing. Filed Nov. 6, 1964, Ser. No. 409,599
Claims priority, application Germany, Nov. 9, 1963, D 42,899
6 Claims. (Cl. 260—570.5)

The present invention relates to novel araliphatic amines of the following formula:

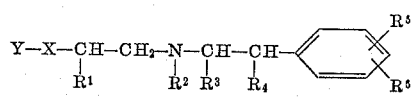

wherein:

$Y$ = a condensed multi-ring aromatic radical, one or more rings of which can be partially or completely saturated and which may carry one or more substituents such as chlorine, methyl or methoxy groups, such as, for example, naphthyl, tetrahydronaphthyl, fluorene, anthracene, phenanthrene, chloronaphthyl, methoxy, naphthyl or methylnaphthyl radicals
$X$ = —CO— or CH(OH)—
$R^1$ = hydrogen methyl or ethyl
$R^2$ and $R^3$ each = hydrogen or methyl
$R^4$ = hydrogen or —OH
$R^5$ and $R^6$ each = hydrogen, methyl, methoxy, nitro or chlorine— and their pharmaceutically acceptable acid addition salts and quaternary ammonium compounds.

The compounds according to the invention have useful pharmaceutical properties, especially for heart and circulation conditions. They are particularly suited for improvement of the heart function in possessing activity favorably increasing the heart output with a simultaneous good coronary dilating activity.

For the sake of simplicity, in the following general description of the processes for the production of the novel compounds according to the invention, the radical

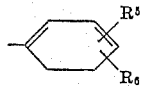

appearing in the right end of the structural formula given for such compounds will be designated as —Ph.

The compounds according to the invention, for example, can be prepared by reacting a compound of the formula

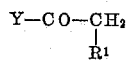

with a compound of the formula

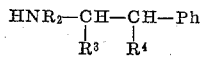

together with formaldehyde or a formaldehyde yielding substance. Preferably, the reaction is carried out at raised temperatures in the presence of a solvent.

It also is possible to react a compound of the formula

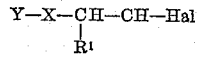

wherein Hal is a halogen atom, preferably chlorine or bromine, with a compound of the formula

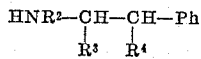

Preferably such reaction is carried out at raised temperatures in the presence of a solvent and a basically reacting substance such as alkali metal alcoholate, sodium amide, potassium carbonate, a tertiaryamine or the like.

Similarly the compounds can also be prepared by reacting a compound of the formula

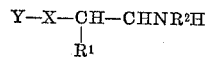

with a compound of the formula

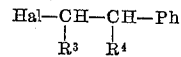

In the event the compound produced is one wherein —X— is —CO— it is possible to convert such compound or its salts into a compound wherein —X— is

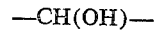

by catalytic hydrogenation, that is, treatment with hydrogen in the presence of a catalyst or other reductions known per se using, for example, sodium or lithium borohydride, alkali metal alcoholates, alkaline earth metal alcoholates or aluminum alcoholates as the reducing agents.

In addition, compounds according to the invention wherein $X$ = —CO— can be prepared by reacting a compound of the formula YMe, wherein Me is a lithium, sodium or potassium atom or a compound of the formula YMgHal with a compound of the formula

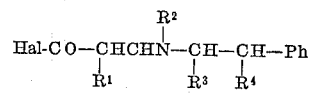

wherein Hal is a halogen atom, preferably chlorine or bromine.

Compounds according to the invention wherein $X$ = —CO— also can be prepared by reacting a compound of the formula YMgHal with a compound of the formula

In the presence of water the amino ketones according to the invention are produced.

It also is possible to produce the compounds according to the invention by reductive condensation of a compound of the formula

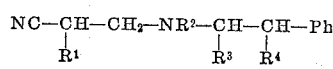

with a compound of the formula

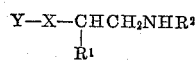

The bases which are produced which contain optically active carbon atoms and as a rule occur as racemates can be reacted with an optically active acid and be resolved into the optically active isomers by fractional precipitation or crystallization.

Furthermore the novel bases according to the invention can be converted to their acid addition salts with acids having phamaceutically acceptable anions such as HCl, $H_2SO_4$, $H_3PO_4$, citric acid, lactic acid, succinic acid, maleic acid and the like and also to the quaternary ammonium compounds with pharmaceutically acceptable quaternizing agents.

The following examples will serve to illustrate the novel compounds according to the invention with reference to a number of specified embodiments thereof. The radical Z in the formulae given in the examples signifies the radical:

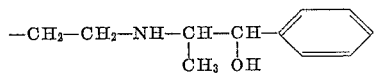

Example 1

{2-[3-phenyl-3-hydroxypropyl-(2)-amino]-ethyl}-α-naphthyl ketone.HCl

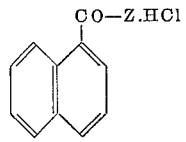

17 g. (0.1 mol) of 1-acetylnaphthalene, 18.7 g. (0.1 mol) of 1-norephedrine.HCl and 4 g. (0.13 mol) of paraformaldehyde in 40 cc. of isopropanol to which 2 drops of concentrated HCl had been added were refluxed for 1 hour on a water bath. 100 cc. of acetone were then added to the solution while it was still warm. The hydrochloride of the amino ketone product which precipitated out from the solution upon cooling was recrystallized from methanol. Its melting point is 195–196° C.

Analogously the corresponding β-naphthyl amino ketone.HCl was prepared from 2-acetylnaphthalene.HCl and paraformaldehyde. Its melting point was 205–206° C.

Example 2

2-{3-[3-phenyl-3-hydroxy-propyl-(2)-amino]-propionyl}tetrahydronaphthalene

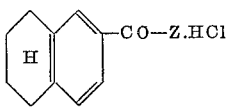

17.5 g. (0.1 mol) of 2-acetyl tetrahydronaphthalene, 18.7 (0.1 mol) of 1-norephedrine.HCl and 4.5 g. (0.15 mol) of paraformaldehyde in 20 cc. of isopropanol to which 2 drops of concentrated HCl were added were refluxed for 1 hour on a water bath. The reaction product was recovered as in Example 1 and its melting point was 206–207° C.

Example 3

2-{3-[3-phenyl-3-hydroxy-propyl-(2)-amino]-propionyl}fluorene.HCl

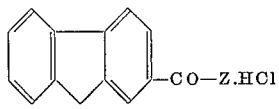

20.8 g. (0.1 mol) of 2 acetyl fluorene, 18.7 g. (0.1 mol) of 1-norephedrine.HCl and 4.5 g. (0.15 mol) of paraformaldehyde in 50 cc. of isopropanol were boiled under reflux on a water bath for 1 hour. The resulting crystal paste in the reaction vessel was stirred up thoroughly with 100 cc. of acetone while still warm and filtered on a suction filter. The hydrochloride of the product which was produced which was retained on the filter was recrystallized from glacial acetic acid. Its melting point was 218–220° C.

Example 4

9-{3-[3-phenyl-3-hydroxy-propyl-(2)-amino]-propionyl}-anthracene.HCl

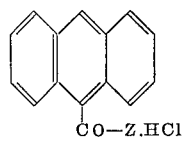

22 g. (0.1 mol) of 9-acetylanthracene, 18.73 (0.1 mol) of 1-norephedrine.HCl and 4.5 g. (0.15 mol) of paraformaldehyde in 50 cc. of isopropanol to which 2 drops of concentrated HCl had been added were refluxed for 1 hour on a water bath. Additionally, 1 gram of paraformaldehyde was then added and the mixture refluxed for a further half-hour. The hydrochloride of the reaction product was recovered as in Example 3 and had a melting point of 202–203° C.

3-{3-[3-phenyl-3-hydroxy-propyl-(2)-amino]-propionyl}-phenanthrene.HCl

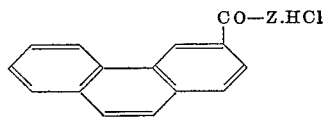

was prepared analogously from 3 acetyl phenanthrene, 1-norephedrine.HCl and paraformaldehyde. Its melting point was 204–205° C.

Example 5

{2-[3-phenyl-3-hydroxy-propyl-(2)-amino-ethyl}4-chloro-naphthyl-(1)]-ketone.HCl

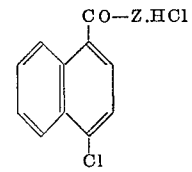

60 g. (0.3 mol) of 1-chloro-4 acetylnaphthalene, 51.1 g. (0.3 mol) of 1-norephedrine.HCl and 10.5 g. (0.35 mol) of paraformaldehyde in 150 cc. of isopropanol to which 6 drops of concentrated HCl had been added were refluxed for 1 hour on a water bath. Additionally, 1.5 g. of paraformaldehyde was then added and the mixture refluxed for a further hour. The hydrochloride of the reaction product was recovered analogously as in Example 1 and recrystallized from glacial acetic acid. It had a melting point of 188–189° C.

Example 6

[3-phenyl-3-hydroxy-propyl-(2)]-[3-naphthyl-(2)-3-hydroxy-propyl-(1)]-amine.HCl

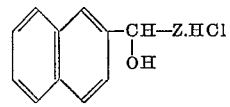

6 g. of NaBH₄ ethanol were added dropwise to 37 g. (0.1 mol) of finely pulverized {2-[3-phenyl-3-hydroxy-propyl-(2)-amino] - ethyl}-β-naphthyl-ketone.HCl in 250 cc. of ethanol at room temperature while stirring. After 1 hour 15 cc. of concentrated HCl were added while cooling with ice. The precipitated NaCl was filtered off and the filtrate boiled down. The remaining hydrochloride of the amino alcohol was recrystallized from isopropanol. Its melting point was 199–200° C.

Example 7

[3-phenyl-3-hydroxy-propyl-(2)]-{-[1,2,3,4-tetrahydronaphthalene-(6)]-3-hydroxy-propyl-(1)}amine.HCl

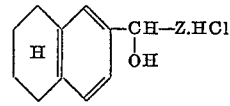

37 g. (0.1 mol) of 2-{3-[3-phenyl-3-hydroxy-propyl-(2)-amino] - propionyl}tetrahydronaphthalene.HCl were reduced as described in Example 6 with 5 g. of NaBH₄. Then, the product decomposed with 10% NaOH and diluted with 500 cc. of water and extracted with ether. The ether solution was dried over K₂CO₃, neutralized with ethanolic HCl and the ether distilled off. The remaining hydrochloride was recrystallized from isopropanol. Its melting point was 200–201° C.

Example 8

{2-[2-(4-chlorophenyl)-2-hydroxy-ethyl-amino]-ethyl}-α-naphthyl-ketone.HCl

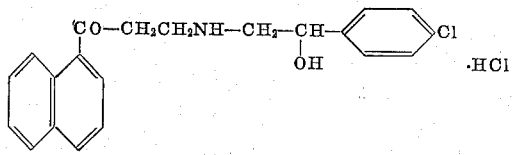

17 g. (0.1 mol) of 1-acetylnaphthalene, 20.8 g. (0.1 mol) of 1-(4-chlorophenyl)-ethanol-(1)-amine-(2)HCl and 4.8 g. (0.15 mol) of paraformaldehyde were refluxed in 50 cc. of ethanol for 2 hours on a water bath. Thereafter, the solvent was distilled off and the remainder treated with acetone. The crystalline hydrochloride produced was recrystallized from ethanol. It had a melting point of 195–196° C.

Example 9

{2-[3-phenyl-3-hydroxy-propyl-(2)-amino]-ethyl}-[4-methoxy-naphthyl-(1)]-ketone.HCl

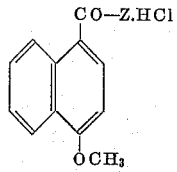

Example 10

{2-[3-phenyl-3-hydroxy-propyl-(2)-amino]-ethyl}-[4,8-dimethoxy-naphthyl-(1)]-ketone.HCl

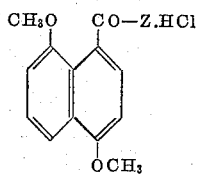

23 g. (0.1 mol) of 1-acetyl-4,8-dimethoxy-naphthylene, 18.7 g. of (0.1 mol) of 1-norephedrine.HCl and 4.5 g. (0.15 mol) of paraformaldehyle were reacted and the hydrochloride product precipitated as described in Example 9. Such hydrochloride after recrystallization from glacial acetic acid and then from 60% methanol had a melting point of 242–244° C.

{2-[3-phenyl-3-hydroxy-propyl-(2)-amino]-ethyl}-[4,6-dimethoxy-naphthyl-(1)]-ketone.HCl

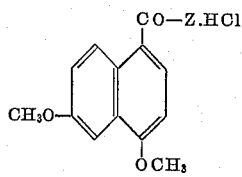

was prepared analogously from 1-acetyl-4,6-dimethoxy-naphthylene, 1-norephedrine.HCl and paraformaldehyde. After recrystallization from methanol, such hydrochloride had a melting point of 209–210° C.

Example 11

{2-[3-phenyl-3-hydroxy-propyl-(2)-amino]-ethyl}-[4-methyl naphthyl-(1)]-ketone.HCl

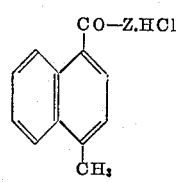

36.8 g. (0.2 mol) of 1-acetyl-4-methyl naphthalene, 37.4 (0.2 mol) of 1-norephedrine.HCl and 6 g. (0.2 mol) of paraformaldehyde in 100 cc. of isopropanol were refluxed for 1 hour on a water bath. After addition of a further 3 g. of paraformaldehyde the mixture was refluxed for a further ½ hour. The hydrochloride precipitated out when the reaction solution cooled down. After recrystallization from methanol its melting point was 203–204° C.

Example 12

{2-[3-phenyl-3-hydroxy-propyl-(2)-amino]-ethyl}-[2,6-dimethyl-naphthyl-(1)]-ketone.HCl

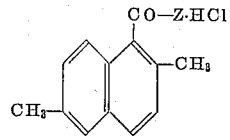

39.6 g. (0.2 mol) of 1-acetyl-2.6-dimethyl naphthalene, 37.7 g. (0.2 mol) of 1-norephedrine.HCl and 6 g. (0.2 mol) of paraformaldehyde in 100 cc. of isopropanol were refluxed for 1 hour on a water bath. After addition of a further 3 g. of paraformaldehyde the mixture was refluxed for a further ½ hour and then it was diluted with 200 cc. of acetone. The hydrochloride which precipitated out was recrystallized from isopropanol. Its melting point was 156—166° C.

Example 13

{2-[2-(3-methoxy-phenyl)-2-hydroxy-ethyl-amino]-ethyl}-α-naphthyl-ketone.HCl

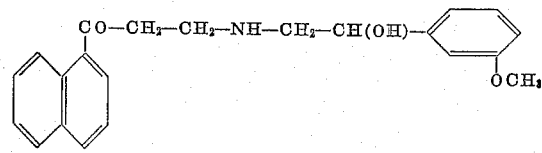

8.5 g. (0.05 mol) of 1-acetyl-naphthalene, 1.5 g. (0.05 mol) of paraformaldehyde and 10.2 g. (0.05 mol) 1-(3-methoxy-phenyl)-ethanol-(1)-amine-(2).HCl were heated in 25 cc. of isopropanol for 30 minutes on a water bath. 0.7 g. (0.025 mol) of paraformaldehyde were then added and for 1 hour refluxed. After cooling the hydrochloride precipitated and was washed with acetone and recrystallized from glacial acetic acid. Such hydrochloride had a melting point of 193–194° C.

Example 14

{2-[3-phenyl-3-hydroxy-propyl-(2)-amino]-ethyl}-[2-methoxy-naphthyl-(1)]-ketone.HCl

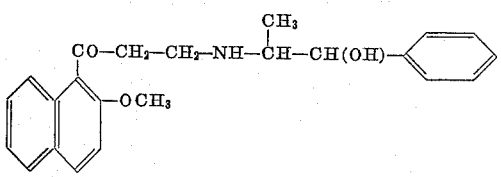

59 g. (0.3 mol) of 1-acetyl-2-methoxy-naphthalene, 56 g. (0.3 mol) 1-norephedrine.HCl and 13.5 g. (0.45 mol) paraformaldehyde were heated in 150 cc. isopropanol for 4 hours on a water bath. The solvent was then distilled off and the remainder treated with acetone. The hydrochloride was recrystallized from ethanol and had a melting point from 178–189° C.

Example 15

{2-[3-phenyl-3-hydroxy-propyl-(2)-amino]-ethyl}-[4-hydroxy-naphthyl-(1)]-ketone.HCl

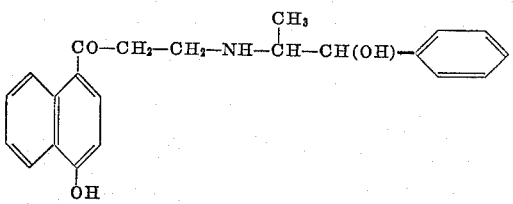

36 g. (0.158 mol) of 1-acetyl-4-acetoxy-naphthalene, 29.4 g. (0.158 mol) of 1-norephedrin.HCl and 4.5 g. (0.15 mol) paraformaldehyde were heated in 100 cc. isopropanol for 30 minutes on a water bath. 4.5 g. (0.15 mol) paraformaldehyde were then added and refluxed for 3 hours. Thereafter the compound was precipitated with acetone. The acetyl group was split off by heating with 50 cc. methanol (75%) which contained 10 drops of concentrated HCl for 3 hours on a water bath. After cooling the hydrochloride was precipitated with ether and recrystallized from a mixture of acetone and ethanol (2:1). It had a melting point from 126 to 127° C.

*Example 16*

{2-[2-(3,5-dimethoxy-phenyl)-2-hydroxy-ethyl-amino]-ethyl}-[4-methyl-naphthyl-(1)]-ketone.HCl

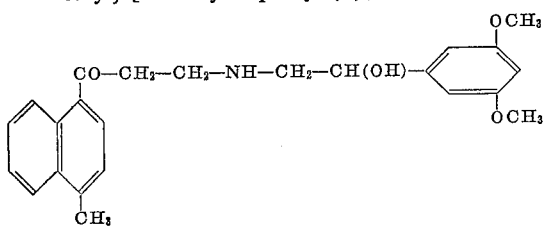

23.2 g. (0.1 mol) of 4-methyl-1-β-chloropropionaphthone and 19.7 g. (0.1 mol) of 1 - (3,5 - dimethoxy - phenyl)-ethanol-(1)-amine-(2) were heated in 100 cc. ethanol for 1 hour on a water bath. Thereafter, the solvent was distilled off and the remainder treated with acetic ester. The hydrochloride produced was recrystallized from ethanol. It had a melting point from 180–181° C.

*Example 17*

[3-phenyl-3-hydroxy-propyl-(2)]-{3-[4-methoxy-naphthyl-(1)]-3-hydroxy-propyl-(1)}-amine.HCl

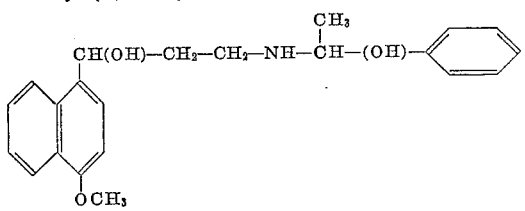

3 g. platiniumoxide in 50 cc. methanol were hydrogenated and thereafter a suspension of 52 g. {2-[3-phenyl-3-hydroxy-propyl-(2)-amino]-ethyl} - 4 - methoxynaphthyl-(1)-ketone.HCl in 300 cc. methanol was added. The hydrogenation was carried out at 20° C. until the calculated amount of hydrogen was used up. Then the solvent was distilled off in vacuum. The hydrochloride precipitated in form of a syrup which grew stiff after some time. It was recrystallized from ethanol and had a melting point of 178° C.

We claim:

1. A compound of the formula

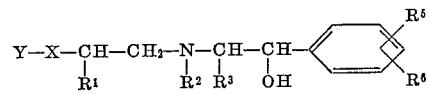

wherein Y is a radical selected from the group consisting of naphthyl, tetrahydronaphthyl, fluorenyl, phenanthryl, monochloronaphthyl, monomethoxynaphthyl, dimethoxynaphthyl, monomethylnaphthyl and dimethylnaphthyl, X is a divalent radical selected from the group consisting of —CO— and —CH(OH)—, $R_1$ is a radical selected from the group consisting of hydrogen, methyl and ethyl, $R^2$ and $R^3$ each are selected from the group consisting of hydrogen and methyl, and $R^5$ and $R^6$ each are selected from the group consisting of hydrogen, methyl, methoxy and chlorine.

2. {2-[3-phenyl-3-hydroxy - propyl-(2)-amino]-ethyl}-α-naphthyl ketone.

3. [3-phenyl-3-hydroxy - propyl-(2)]-[3-naphthyl-(2)-3-hydroxy-propyl-(1)]-amine.

4. {2-[2-(4-chlorophenyl)-2-hydroxy - ethyl - amino]-ethyl}-α-naphthyl ketone.

5. {2-[2-(3,5-dimethoxy-phenyl)-2 - hydroxy - ethylamino]-ethyl}-[4-methyl-naphthyl-(1)]-ketone.

6. [3-phenyl-3-hydroxy-propyl-(2)]-{3 - [4 - methoxynaphthyl-(1)]-3-hydroxy-propyl-(1)}-amine.

References Cited

UNITED STATES PATENTS 2,520,153  8/1950  Lawson et al.
2,527,798  10/1950  Cusic _____ 260—570.6 XR
3,152,173  10/1964  Ehrhart et al. ___ 260—570.8 XR

OTHER REFERENCES

Allewelt et al.: "Jour. Organic Chem.," vol. 6, pages 397–400 (1941).

Ray et al.: "Jour. Amer. Chem. Soc.," vol. 69, pages 587–9 (1947).

CHARLES B. PARKER, *Primary Examiner.*

ROBERT V. HINES, *Assistant Examiner.*